United States Patent
Chou et al.

(10) Patent No.: US 8,834,084 B2
(45) Date of Patent: Sep. 16, 2014

(54) FASTENING ASSEMBLY

(75) Inventors: Yu-Cheng Chou, New Taipei (TW); Lian-Cheng Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 53 days.

(21) Appl. No.: 13/557,537

(22) Filed: Jul. 25, 2012

(65) Prior Publication Data

US 2013/0164095 A1 Jun. 27, 2013

(30) Foreign Application Priority Data

Dec. 22, 2011 (CN) .......................... 2011 1 0435045

(51) Int. Cl.
*F16B 13/12* (2006.01)
*F16B 13/06* (2006.01)
(52) U.S. Cl.
CPC ............. *F16B 13/124* (2013.01); *F16B 13/063* (2013.01)
USPC .......................... 411/60.1; 411/57.1; 411/55
(58) Field of Classification Search
USPC ............ 411/44, 45, 55, 57.1, 60.1, 80.2, 80.5
See application file for complete search history.

(56) References Cited

U.S. PATENT DOCUMENTS

| | | | | |
|---|---|---|---|---|
| 519,172 | A | * | 5/1894 | Calkins ........................ 411/57.1 |
| 1,850,768 | A | * | 3/1932 | Peirce .............................. 411/55 |
| 2,877,682 | A | * | 3/1959 | Barry et al. ................... 411/80.1 |
| 3,298,725 | A | | 1/1967 | Boteler |
| 3,603,626 | A | * | 9/1971 | Whiteside ................... 403/408.1 |
| 4,607,992 | A | * | 8/1986 | Mauritz et al. .................. 411/45 |
| 4,984,945 | A | * | 1/1991 | Bergner ........................... 411/30 |
| RE35,358 | E | * | 10/1996 | Belser ............................ 411/342 |
| 6,012,887 | A | * | 1/2000 | Kaibach et al. ................. 411/30 |
| 6,918,724 | B2 | * | 7/2005 | Eriksson ......................... 411/45 |
| 2003/0108398 | A1 | * | 6/2003 | Sathianathan ............... 411/60.1 |
| 2007/0253794 | A1 | * | 11/2007 | Zhang et al. .................... 411/45 |

* cited by examiner

*Primary Examiner* — Flemming Saether
(74) *Attorney, Agent, or Firm* — Novak Druce Connolly Bove + Quigg LLP

(57) ABSTRACT

A fastening assembly includes a fastening member, a locking member engaged with the fastening member, and an elastic member sleeved on the fastening member. The fastening member forms an arc resisting sidewall. The elastic member includes a main body and a plurality of elastic strips extending from a same side of the main body and spaced from each other. Each elastic strip gradually closes to an center axis of the main body along the direction of away from the main body. Each elastic strip forms an arc protrusion towards the center axis of the main body on an inner wall. The arc protrusion matches with the resisting sidewall.

16 Claims, 4 Drawing Sheets

FASTENING ASSEMBLY

BACKGROUND

1. Technical Field

The present disclosure relates to fastening assemblies, particularly to a fastening assembly for fastening at least two workpieces.

2. Description of Related Art

Fasteners, such as screws, pins, for example, are used for fastening workpieces. When the fasteners fasten workpieces of flexible materials, the workpieces may easily be deformed by the fasteners. This results in positional deviation of workpieces and a low positioning precision of the workpieces.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
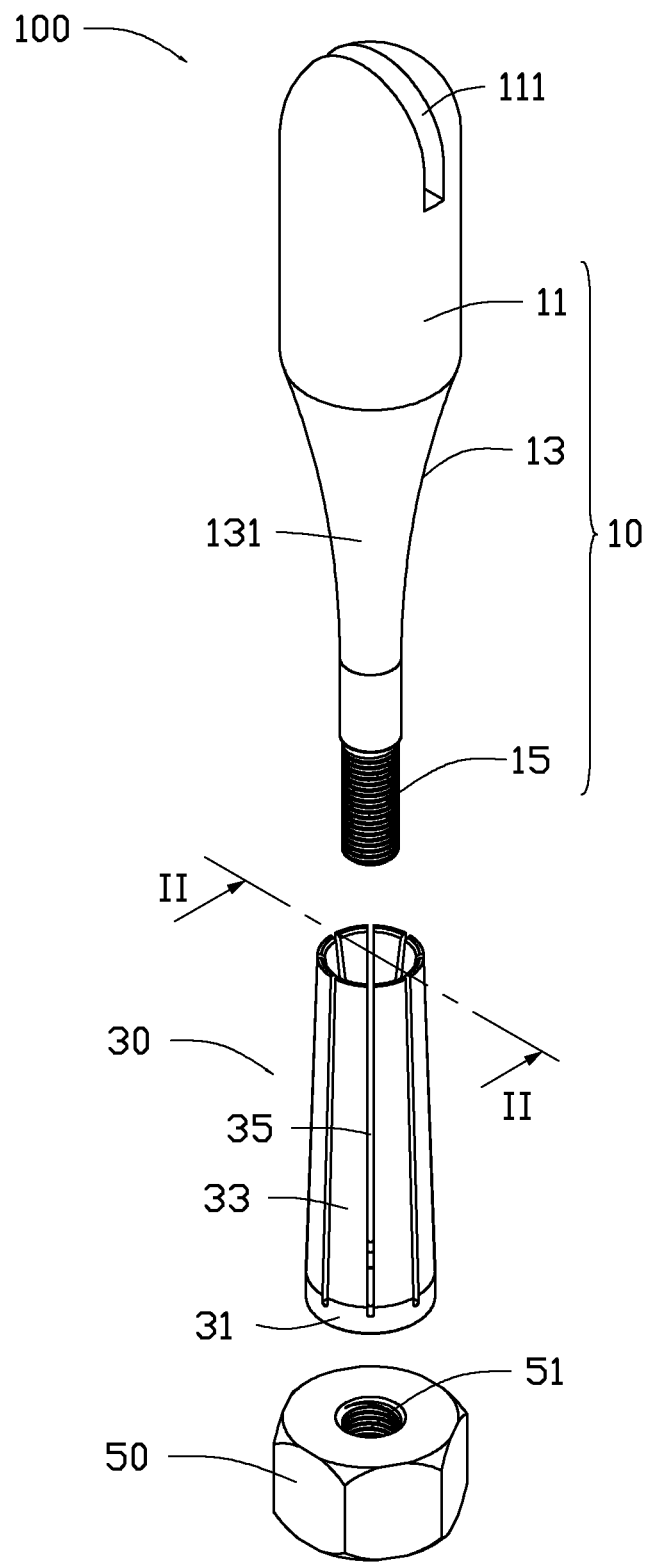
FIG. 1 is an explored, isometric view of an embodiment of a fastening assembly including an elastic member.

FIG. 1 shows an embodiment of a fastening assembly 100 including a fixing member 10, an elastic member 30, and a locking member 50. The elastic member 30 is sleeved on the fixing member 10. The locking member 50 engages with the fixing member 10 to lock the elastic member 30 between the fixing member 10 and the locking member 50.

The fixing member 10 includes a holding portion 11, a resisting portion 13, and a thread portion 15. The resisting portion 13 protrudes from an end of the holding portion 11, and aligns with the holding portion 11. The thread portion 15 is positioned at an end of the resisting portion 13 away from the holding portion 11. The holding member 11 is substantially columnar, and defines a groove 111 at a distal end away from the resisting portion 13. The groove 111 is configured for inserting a tool to rotate the holding portion 11 when the holding portion 11 cannot be conveniently held directly. In other embodiment, the holding portion 11 can be other shapes, such as a prism, for example.

The resisting portion 13 is substantially a solid of revolution of a camber line encircling a center axis of the holding portion 11. The diameter of the resisting portion 13 gradually decreases along a direction of away from the holding portion 11. The resisting portion 13 includes a resisting sidewall 131, which is an arcuate surface. In the illustrated embodiment, an end of the resisting portion 13 adjacent to the holding portion 11 is gentler than an end adjacent to the thread portion 15. The thread portion 15 includes a plurality of threads at an outer sidewall, for engaging with the locking member 50.

The elastic member 30 is substantially a hollow conical frustum, and includes a main body 31 and a plurality of elastic strips 33. The main body 31 is substantially circular, and an inner diameter is smaller than the diameter of the holding portion 11, to ensure the holding portion 11 cannot pass through the main body 31. The elastic strips 33 extend from a flange of the main body 31 and spaced from each other. There is a space 35 between the adjacent elastic strips 33. Each elastic strip 33 gradually becomes closer to a center axis of the main body 31 along the direction of away from the main body 31.

Figure 2:
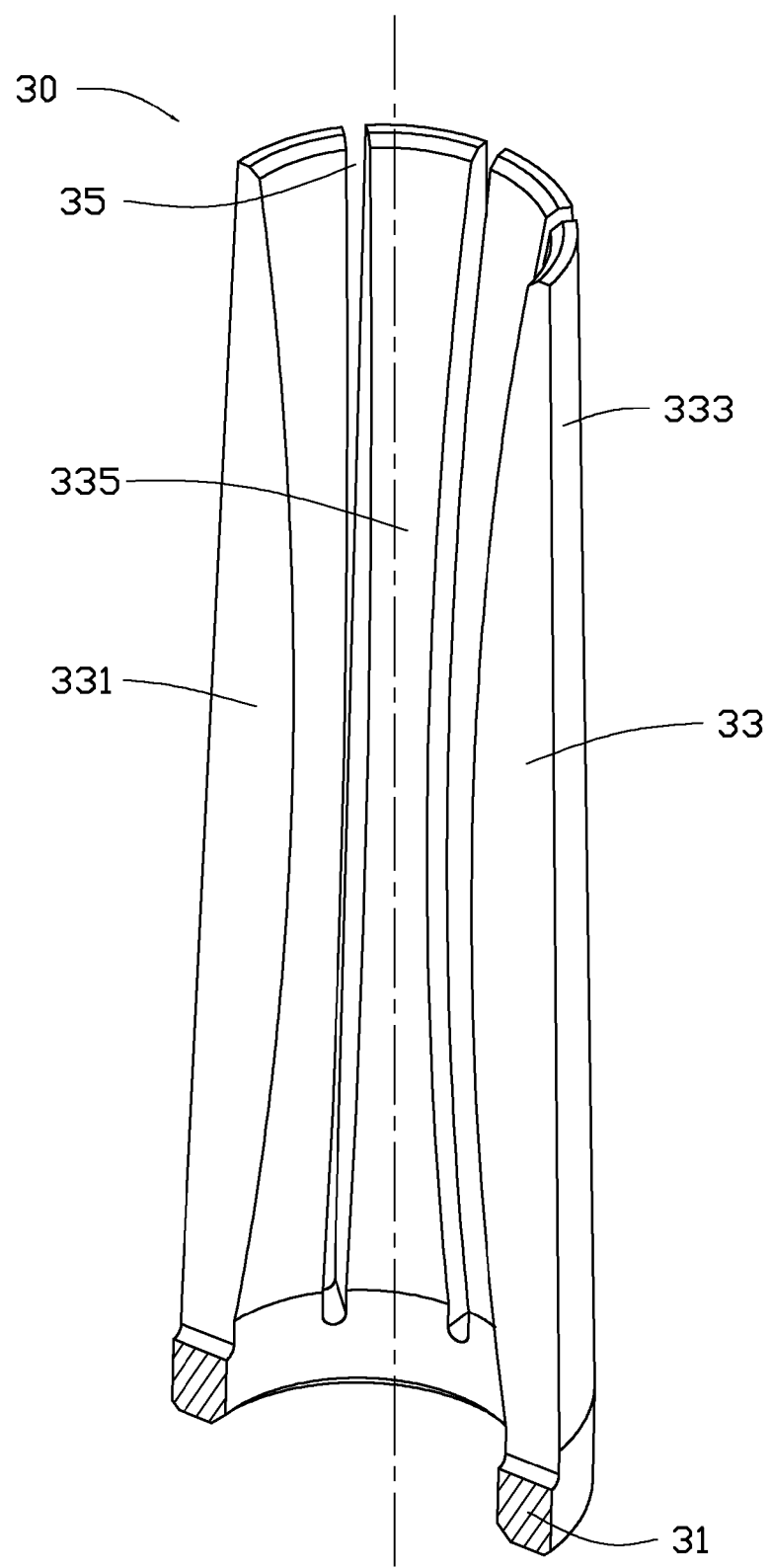
FIG. 2 is a cut-away view of the elastic member of the fastening assembly taken along line II-II shown in FIG. 1.

FIG. 2 shows each elastic strip 33 forming an arc protrusion 331 towards the center axis of the main body 31. The elastic strip 33 includes an outer sidewall 333 and an inner sidewall 335. The arc protrusion 331 protrudes from the inner sidewall 335, and the arc protrusion 331 matches with the resisting sidewall 131. The outer sidewall 333 is substantially arcuate, and a curved direction is substantially same as a curved direction of the main body 31. The outer sidewalls 333 of the elastic strips 33 form a hollow conical frustum cooperatively, and diameters of the hollow conical frustum gradually decrease along a direction of away from the main body 31. The locking member 50 defines a locking hole 51, and an inner sidewall of the locking hole 51 forms a plurality of threads corresponding to the thread portion 15. In the illustrated embodiment, the locking member 50 is a hexagon nut.

Figure 3:
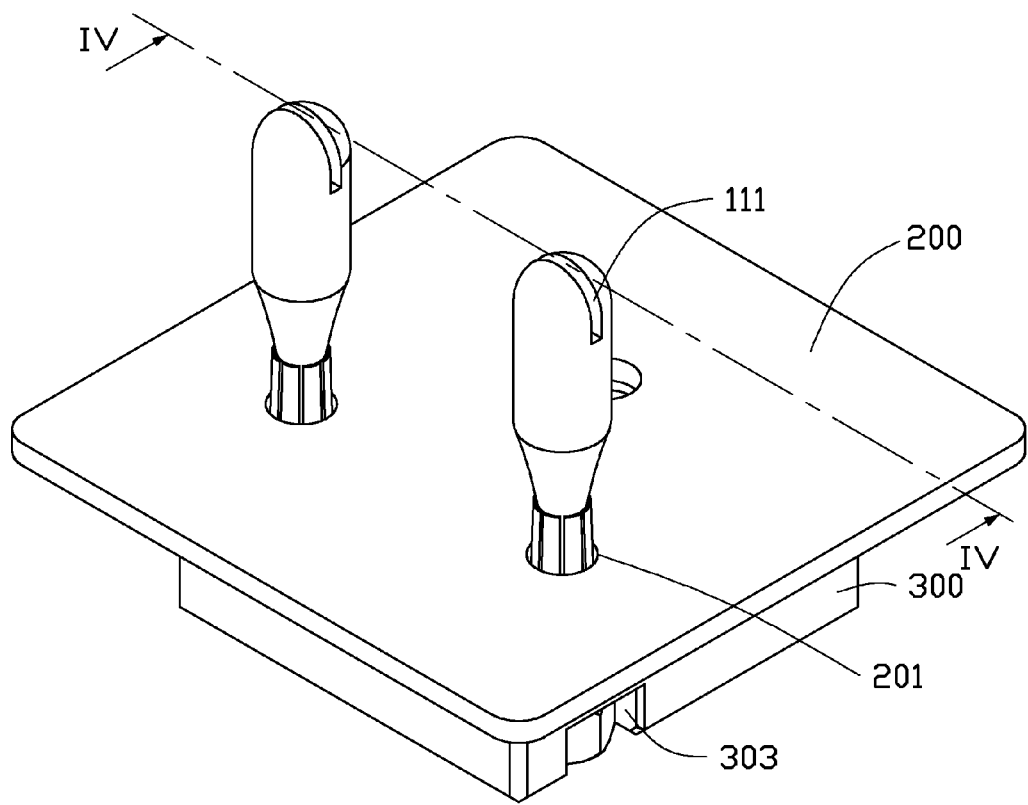
FIG. 3 is an isometric view of the fastening assembly of FIG. 1 in a use state.
Figure 4:
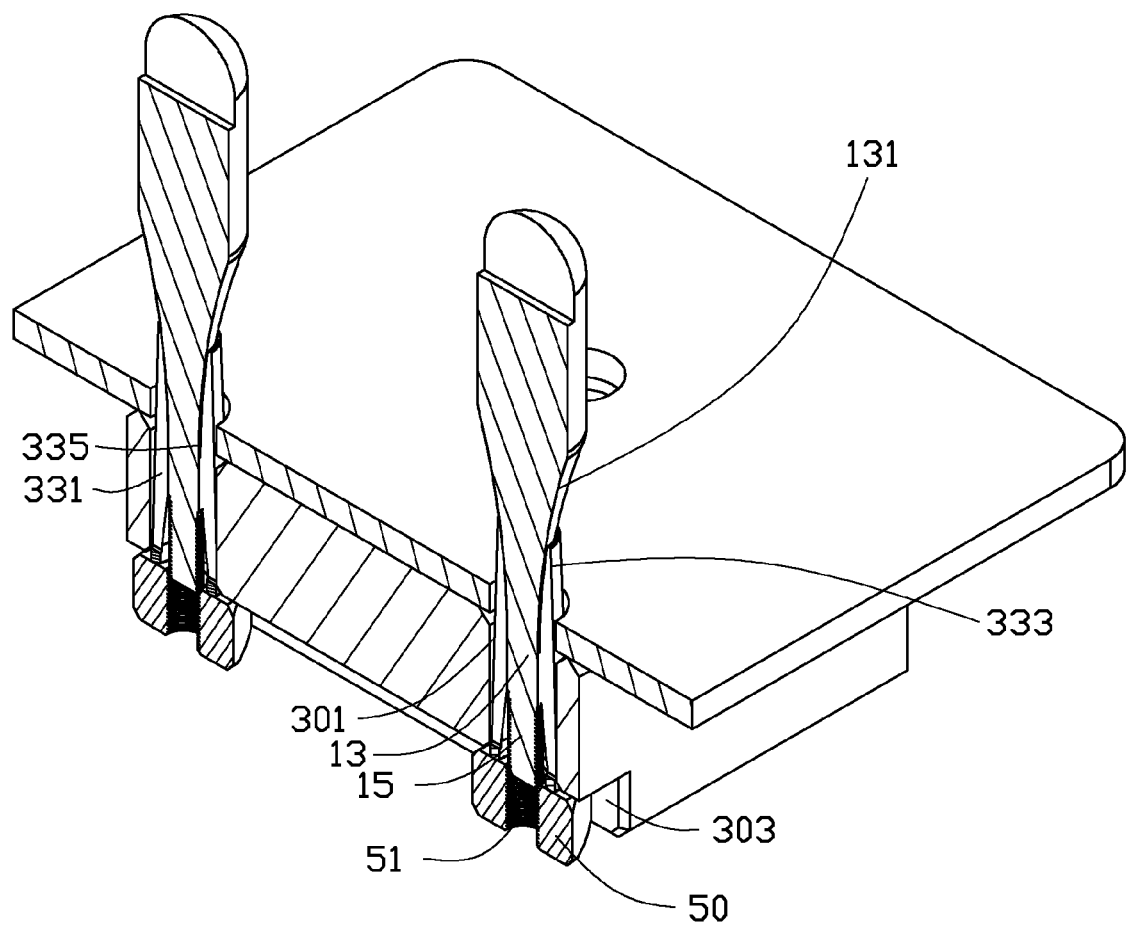
FIG. 4 is cut-away view taken along line IV-IV shown in FIG. 3.

FIGS. 3 and 4 show the fastening assembly 100 fastening a first plate 200 and a second plate 300. The first plate 200 defines a mounting hole 201. The second plate 300 defines a locking hole 301 at a side adjacent to the first plate 200 corresponding to the mounting hole 201, and defines a mounting groove 303 at a side away from the first plate 200. The mounting groove 303 communicates with the locking hole 301, for receiving the locking member 50. In the illustrated embodiment, there are two mounting holes 201 and two locking holes 301, and the mounting hole 201 and the locking hole 301 are circular through holes. Therefore, two fastening assemblies 100 are used to fasten the first plate 200 and the second plate 300.

In assembly, the first plate 200 overlaps with the second plate 300, and the mounting hole 201 is aligned with the locking hole 301. The elastic member 30 is inserted into the mounting hole 201 and the locking hole 301. The main body 31 is received in the locking hole 301, and the elastic strips 33 are partially received in the mounting hole 201 and the locking hole 301. Because the elastic strips 33 gradually close to the center axis of the main body 31 along the direction of away from the main body 31, thus there is gap between the outer sidewalls 333 of the elastic stripes 33 and the sidewall of the mounting hole 201. The fixing member 10 is inserted into the elastic member 30, and the resisting sidewall 131 resists the inner sidewalls 335 of the elastic stripes 33. Because the resisting sidewall 131 is an arcuate surface, and the end of the resisting portion 13 adjacent to the holding portion 11 is gentler than the end adjacent to the thread portion 15, the elastic stripes 33 stretch towards the sidewall of the mounting hole 201 by resisting by the resisting sidewall 131 until the outer sidewalls 333 of the elastic stripes 33 resisting the sidewall of the mounting hole 201. The thread portion 15 is received in the mounting groove 303, and then the locking member 50 is sleeved on the thread portion 15, to engage with the fixing member 10.

In other embodiment, the mounting hole 201 and the locking hole 301 can be other shapes, such as rectangular holes for example, and the outline of the elastic member can be prismatic correspondingly.

Because the fastening assembly 100 including the elastic member 30, the outer sidewall 333 of the elastic member 30 resist the sidewall of the mounting hole 201 and the sidewall of the locking hole 301 in an evenness force when the fastening assembly 100 locking with the first plate 200 and the second plate 300. Therefore, the first plate 200 and the second plate 300 would not to deviate, and the fastening assembly 100 fastens the first plate 200 and the second plate 300 with a high precision.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A fastening assembly, comprising:
    a fixing member comprising a concave arcuate resisting sidewall;
    an elastic member sleeved on the fixing member, and comprising an annular main body defining a center axis, and a plurality of elastic stripes extending from an end of the main body and gradually close to the center axis of the main body along a direction of away from the main body, the elastic stripes spaced from each other, each elastic strip forming a convex arc protrusion towards the center axis of the main body, and the convex arc protrusions matching with the concave arcuate resisting sidewall; and
    a locking member engaged with the fixing member, for locking the elastic member between the fixing member and the locking member.

2. The fastening assembly of claim 1, wherein the fixing member comprises a holding portion and a resisting portion protruding from an end of the holding portion, the resisting portion aligns with the holding portion, the concave arcuate resisting sidewall is an outer sidewall of the resisting portion.

3. The fastening assembly of claim 2, wherein the resisting portion is a solid of revolution of a camber line encircling a center axis of the holding portion, diameters of the resisting portion gradually decrease along a direction of away from the holding portion.

4. The fastening assembly of claim 2, wherein the fixing member further comprises a thread portion formed at an end of the resisting portion away from the holding portion, and the thread portion engages with the locking member.

5. The fastening assembly of claim 4, wherein the locking portion is a nut engaged with the thread portion.

6. The fastening assembly of claim 2, wherein the holding portion defines a groove at a side away from the resisting portion.

7. The fastening assembly of claim 1, wherein the main body is circular, and an inner diameter of the main body is smaller than a diameter of the holding portion, and the plurality of elastic stripes extend from a flange of the main body.

8. The fastening assembly of claim 1, wherein outer sidewalls of the elastic strips form a hollow conical frustum cooperatively, and diameters of the hollow conical frustum gradually decrease along a direction of away from the main body.

9. A fastening assembly for fastening a first plate defining a mounting hole and a second plate defining a locking hole, comprising:
    a fixing member comprising a concave arcuate resisting sidewall;
    an elastic member sleeved on the fixing member, and comprising an annular main body defining a center axis, and a plurality of elastic stripes extending from an end surface of the main body and gradually close to the center axis of the main body along the direction of away from the main body, the elastic stripes spaced from each other, each elastic strip forming a convex arc protrusion towards the center axis of the main body, and the convex arc protrusions matching with the concave arcuate resisting sidewall; outer sidewalls of the plurality of elastic members resisting a sidewall of the mounting hole and a sidewall of the locking hole; and
    a locking member engaged with the fixing member, for locking the elastic member between the fixing member and the locking member.

10. The fastening assembly of claim 9, wherein the fixing member comprises a holding portion and a resisting portion protruding from an end of the holding portion, the resisting portion aligns with the holding portion, and the concave arcuate resisting sidewall is an outer sidewall of the resisting portion.

11. The fastening assembly of claim 10, wherein the resisting portion is a solid of revolution of a camber line encircling an center axis of the holding portion, and diameters of the resisting portion gradually decrease along a direction of away from the holding portion.

12. The fastening assembly of claim 10, wherein the fixing member further comprises a thread portion formed at an end of the resisting portion away from the holding portion, and the thread portion engages with the locking member.

13. The fastening assembly of claim 12, wherein the locking portion is a nut engaged with the thread portion.

14. The fastening assembly of claim 10, wherein the holding portion defines a groove at a side away from the resisting portion.

15. The fastening assembly of claim 9, wherein the main body is circular, and an inner diameter of the main body is smaller than a diameter of the holding portion, and the plurality of elastic stripes extend from a flange of the main body.

16. The fastening assembly of claim 9, wherein outer sidewalls of the elastic strips form a hollow conical frustum cooperatively, and diameters of the hollow conical frustum gradually decrease along a direction of away from the main body.

* * * * *